US010059150B2

(12) United States Patent
Ishikawa (10) Patent No.: US 10,059,150 B2
(45) Date of Patent: Aug. 28, 2018

(54) PNEUMATIC TIRE (71) Applicant: The Yokohama Rubber Co., LTD., Minato-ku, Tokyo (JP)

(72) Inventor: Masanori Ishikawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 527 days.

(21) Appl. No.: 14/434,381

(22) PCT Filed: Oct. 10, 2012

(86) PCT No.: PCT/JP2012/076246
§ 371 (c)(1),
(2) Date: Apr. 8, 2015

(87) PCT Pub. No.: WO2014/057549
PCT Pub. Date: Apr. 17, 2014

(65) Prior Publication Data
US 2015/0258857 A1    Sep. 17, 2015

(51) Int. Cl.
*B60C 9/20*         (2006.01)
*B60C 9/28*         (2006.01)
(Continued)

(52) U.S. Cl.
CPC .............. *B60C 9/20* (2013.01); *B60C 9/2006* (2013.01); *B60C 9/28* (2013.01); *B60C 9/185* (2013.01);
(Continued)

(58) Field of Classification Search
CPC ........... B60C 9/20; B60C 9/2006; B60C 9/28; B60C 9/185; B60C 2009/1828;
(Continued)

(56) References Cited

U.S. PATENT DOCUMENTS 3,513,898 A  *  5/1970  Lugli ................... B60C 9/2006
                                                     152/526
3,599,695 A  *  8/1971  Knight ..................... B60C 3/04
                                                     152/209.14
(Continued)

FOREIGN PATENT DOCUMENTS

JP        H04-066304         3/1992
JP        H08-02210          1/1996
(Continued)

OTHER PUBLICATIONS

IMAC Chart of Tire Nomenclature, Feb. 8, 2002.*
(Continued)

*Primary Examiner* — Jacob T Minskey
*Assistant Examiner* — Melody Tsui
(74) *Attorney, Agent, or Firm* — Thorpe North & Western (57) ABSTRACT

A pneumatic tire comprises: a carcass layer, a belt layer, and a tread rubber. The belt layer is formed by laminating a pair of cross belts having a belt angle of not less than 10° and not more than 45° in absolute terms and of mutually opposite signs, and a circumferential reinforcing layer having a belt angle within a range of ±5° with respect to the tire circumferential direction. A distance ($G_{cc}$) from a tread profile to a tire inner circumference surface along a tire equatorial plane, a distance ($G_{sh}$) from a tread end to the tire inner circumference surface, and a distance ($G_e$) from the tread profile to the tire inner circumference surface at an end portion on the outer side of the circumferential reinforcing layer in the tire width direction have relationships satisfying $1.10 \leq G_{sh}/G_{cc}$ and $1.00 \leq G_e/G_{cc} \leq 1.10$.

17 Claims, 9 Drawing Sheets (51) Int. Cl.
*B60C 11/00* (2006.01)
*B60C 9/18* (2006.01)

(52) U.S. Cl.
CPC .......................... *B60C 2009/1828* (2013.01); *B60C 2009/209* (2013.01); *B60C 2009/2051* (2013.01); *B60C 2009/2083* (2013.01); *B60C 2011/0033* (2013.01); *B60C 2200/06* (2013.01)

(58) Field of Classification Search
CPC .... B60C 2009/2051; B60C 2009/2083; B60C 2009/209; B60C 2011/0033; B60C 2200/06
See application file for complete search history.

(56) References Cited

U.S. PATENT DOCUMENTS

| | | | |
|---|---|---|---|
| 5,849,121 A * | 12/1998 | Reuter | B60C 9/0042 152/527 |
| 6,401,778 B1 | 6/2002 | Cluzel | |
| 7,469,731 B2 * | 12/2008 | Kuroki | B60C 11/00 152/209.1 |
| 2006/0169380 A1 | 8/2006 | Radulescu et al. | |
| 2006/0169381 A1 | 8/2006 | Radulescu et al. | |
| 2006/0169383 A1 | 8/2006 | Radulescu et al. | |
| 2009/0277557 A1 * | 11/2009 | Suzuki | B60C 9/2006 152/532 |
| 2011/0114238 A1 | 5/2011 | Takahashi et al. | |
| 2012/0097307 A1 | 4/2012 | Delebecq et al. | |
| 2014/0326380 A1 | 11/2014 | Kotoku | |

FOREIGN PATENT DOCUMENTS

| | | | |
|---|---|---|---|
| JP | 2001-522748 | 11/2001 | |
| JP | 2006-528103 | 12/2006 | |
| JP | 2008-001264 | 1/2008 | |
| JP | 2009-018629 | 1/2009 | |
| JP | 2009-166819 | 7/2009 | |
| JP | 4354114 | 10/2009 | |
| JP | 4642760 | 3/2011 | |
| JP | 4663638 | 4/2011 | |
| JP | 4663639 | 4/2011 | |
| JP | 4918948 | 4/2012 | |
| JP | 4984013 | 7/2012 | |
| JP | 2012-522686 | 9/2012 | |
| WO | WO 99/24269 | 5/1999 | |
| WO | WO 2005/016666 | 2/2005 | |
| WO | WO 2005/016667 | 2/2005 | |
| WO | WO 2005/016668 | 2/2005 | |
| WO | WO-2005016668 A1 * | 2/2005 | ............... B60C 3/04 |
| WO | WO 2005016668 A1 * | 2/2005 | ............... B60C 3/04 |
| WO | WO 2007/148447 | 12/2007 | |
| WO | WO2009078425 | 6/2009 | |
| WO | WO 2010/115891 | 10/2010 | |
| WO | WO 2013/042256 | 3/2013 | |

OTHER PUBLICATIONS

KG Motorcycle Tires & Accessories Reference Chart, copyright 2006.*
International Search Report for International Application No. PCT/JP2012/076246 dated Dec. 11, 2012, 4 pages, Japan.

* cited by examiner

| | Comparative Example | Working Example 1 | Working Example 2 | Working Example 3 | Working Example 4 | Working Example 5 | Working Example 6 | Working Example 7 | Working Example 8 | Working Example 9 | Working Example 10 | Working Example 11 | Working Example 12 |
|---|---|---|---|---|---|---|---|---|---|---|---|---|---|
| Circumferential reinforcing layer | Yes | Yes | Yes | Yes | Yes | Yes | Yes | Yes | Yes | Yes | Yes | Yes | Yes |
| Gsh/Gcc | 1.06 | 1.10 | 1.20 | 1.20 | 1.25 | 1.25 | 1.25 | 1.25 | 1.25 | 1.20 | 1.25 | 1.25 | 1.25 |
| Ge/Gcc | 0.80 | 1.00 | 1.00 | 1.05 | 1.05 | 1.10 | 1.05 | 1.05 | 1.05 | 1.05 | 1.05 | 1.05 | 1.05 |
| De/Dcc | 0.90 | 0.90 | 0.90 | 0.90 | 0.90 | 0.90 | 0.95 | 1.00 | 1.05 | 1.00 | 1.00 | 1.00 | 1.00 |
| Yc/Ya | 0.75 | 0.75 | 0.75 | 0.75 | 0.75 | 0.75 | 0.75 | 0.75 | 0.75 | 0.80 | 0.80 | 0.85 | 0.90 |
| Yd/Ya | 0.80 | 0.80 | 0.80 | 0.80 | 0.80 | 0.80 | 0.80 | 0.80 | 0.80 | 0.80 | 0.98 | 0.98 | 0.98 |
| Ws/TW | 0.60 | 0.60 | 0.60 | 0.60 | 0.60 | 0.60 | 0.60 | 0.60 | 0.60 | 0.60 | 0.60 | 0.60 | 0.60 |
| S/Wb3 | 0.025 | 0.025 | 0.025 | 0.025 | 0.025 | 0.025 | 0.025 | 0.025 | 0.025 | 0.025 | 0.025 | 0.025 | 0.025 |
| Belt cord rupture resistance | 100 | 102 | 106 | 107 | 109 | 108 | 110 | 112 | 111 | 113 | 115 | 118 | 117 |

| | Working Example 13 | Working Example 14 | Working Example 15 | Working Example 16 | Working Example 17 | Working Example 18 | Working Example 19 | Working Example 20 | Working Example 21 | Working Example 22 | Working Example 23 | Working Example 24 | Working Example 25 | Working Example 26 |
|---|---|---|---|---|---|---|---|---|---|---|---|---|---|---|
| Circumferential reinforcing layer | Yes | Yes | Yes | Yes | Yes | Yes | Yes | Yes | Yes | Yes | Yes | Yes | Yes | Yes |
| Gsh/Gcc | 1.20 | 1.25 | 1.25 | 1.25 | 1.20 | 1.25 | 1.25 | 1.25 | 1.25 | 1.25 | 1.25 | 1.25 | 1.25 | 1.25 |
| Ge/Gcc | 1.05 | 1.05 | 1.05 | 1.05 | 1.05 | 1.05 | 1.05 | 1.05 | 1.05 | 1.05 | 1.05 | 1.05 | 1.05 | 1.05 |
| De/Dcc | 1.00 | 1.00 | 1.00 | 1.00 | 1.00 | 1.00 | 1.00 | 1.00 | 1.00 | 1.00 | 1.00 | 1.00 | 1.00 | 1.00 |
| Yc/Ya | 0.75 | 0.85 | 0.85 | 0.85 | 0.75 | 0.85 | 0.85 | 0.85 | 0.85 | 0.85 | 0.85 | 0.85 | 0.85 | 0.85 |
| Yd/Ya | 0.90 | 0.90 | 0.95 | 1.00 | 1.00 | 0.95 | 0.95 | 0.95 | 0.95 | 0.95 | 0.95 | 0.95 | 0.95 | 0.95 |
| Ws/TW | 0.60 | 0.60 | 0.60 | 0.60 | 0.60 | 0.70 | 0.80 | 0.90 | 0.80 | 0.80 | 0.80 | 0.80 | 0.80 | 0.80 |
| S/Wb3 | 0.025 | 0.025 | 0.025 | 0.025 | 0.025 | 0.025 | 0.025 | 0.025 | 0.030 | 0.050 | 0.070 | 0.090 | 0.110 | 0.130 |
| Belt cord rupture resistance | 115 | 117 | 119 | 118 | 114 | 120 | 122 | 121 | 123 | 124 | 124 | 123 | 122 | 121 |

PNEUMATIC TIRE

TECHNICAL FIELD

The present technology relates to a pneumatic tire, and in particular to a pneumatic tire with improved rupture resistance of belt cords.

BACKGROUND

Recently, heavy duty tires mounted on trucks, buses, and the like are able to retain the shape of the tread portion due to the tires having a low aspect ratio on the one hand and due to the disposition of a circumferential reinforcing layer in the belt layer on the other hand. The circumferential reinforcing layer is a belt ply having a belt angle that is substantially 0° with respect to the tire circumferential direction, and is disposed laminated on a pair of cross belts. The technologies disclosed in Japanese Patent Nos. 4642760B, 4663638B and 4663639B are conventional pneumatic tires that are configured in this manner.

SUMMARY

The present technology provides a pneumatic tire with improved rupture resistance of belt cords.

A pneumatic tire according to the present technology comprises a carcass layer, a belt layer disposed on the outer side of the carcass layer in the tire radial direction, and a tread rubber disposed on the outer side of the belt layer in the tire radial direction, at least three circumferential main grooves extending in the tire circumferential direction and a plurality of land portions defined by the circumferential main grooves. The belt layer is formed by laminating a pair of cross belts having a belt angle of not less than 10° and not more than 45° in absolute terms and of mutually opposite signs, and a circumferential reinforcing layer having a belt angle within a range of ±5° with respect to the tire circumferential direction. A distance Gcc from a tread profile to a tire inner circumferential surface along a tire equatorial plane, a distance Gsh from a tread end to the tire inner circumferential surface, and a distance Ge from the tread profile to the tire inner circumferential surface at an end portion on the outer side of the circumferential reinforcing layer in the tire width direction have relationships satisfying $1.10 \leq Gsh/Gcc$ and $1.00 \leq Ge/Gcc \leq 1.10$.

In a pneumatic tire according to the present technology, (1) a ratio Gsh/Gcc is increased whereby the tread surface has a flat shape (approximately parallel to the tire rotational axis) as a whole and the volume (distance Gsh) of a tread rubber at the shoulder portion is ensured. As a result, the amount of deformation of the shoulder portion while the tire is in contact with the ground is reduced. Moreover, (2) the distance Ge and the distance Gcc are set to be approximately the same under the aforementioned condition of $1.10 \leq Gsh/Gcc$ whereby the amount of deformation of the tread portion near the end portions of the circumferential reinforcing layer while the tire is in contact with the ground is reduced. Consequently, there is an advantage that repeating strain at the end portions of the circumferential reinforcing layer while the tire is rolling is reduced and rupturing of the belt cords of the circumferential reinforcing layer is suppressed. There is an advantage that the occurrence of separation of the peripheral rubbers at the end portions of the belt plies and the occurrence of separation of the cord rubbers between adjacent belt plies are suppressed. In particular, there is an advantage that the occurrence of separation at the end portions of the circumferential reinforcing layer is suppressed.

DETAILED DESCRIPTION

The present technology is described below in detail with reference to the accompanying drawings. Note that the present technology is not limited to this embodiment. Moreover, constituents of the embodiment which can possibly or obviously be substituted while maintaining consistency with the present technology are included. Furthermore, a plurality of modified examples that are described in the embodiment can be freely combined within a scope of obviousness for a person skilled in the art.

Pneumatic Tire

Figure 1:
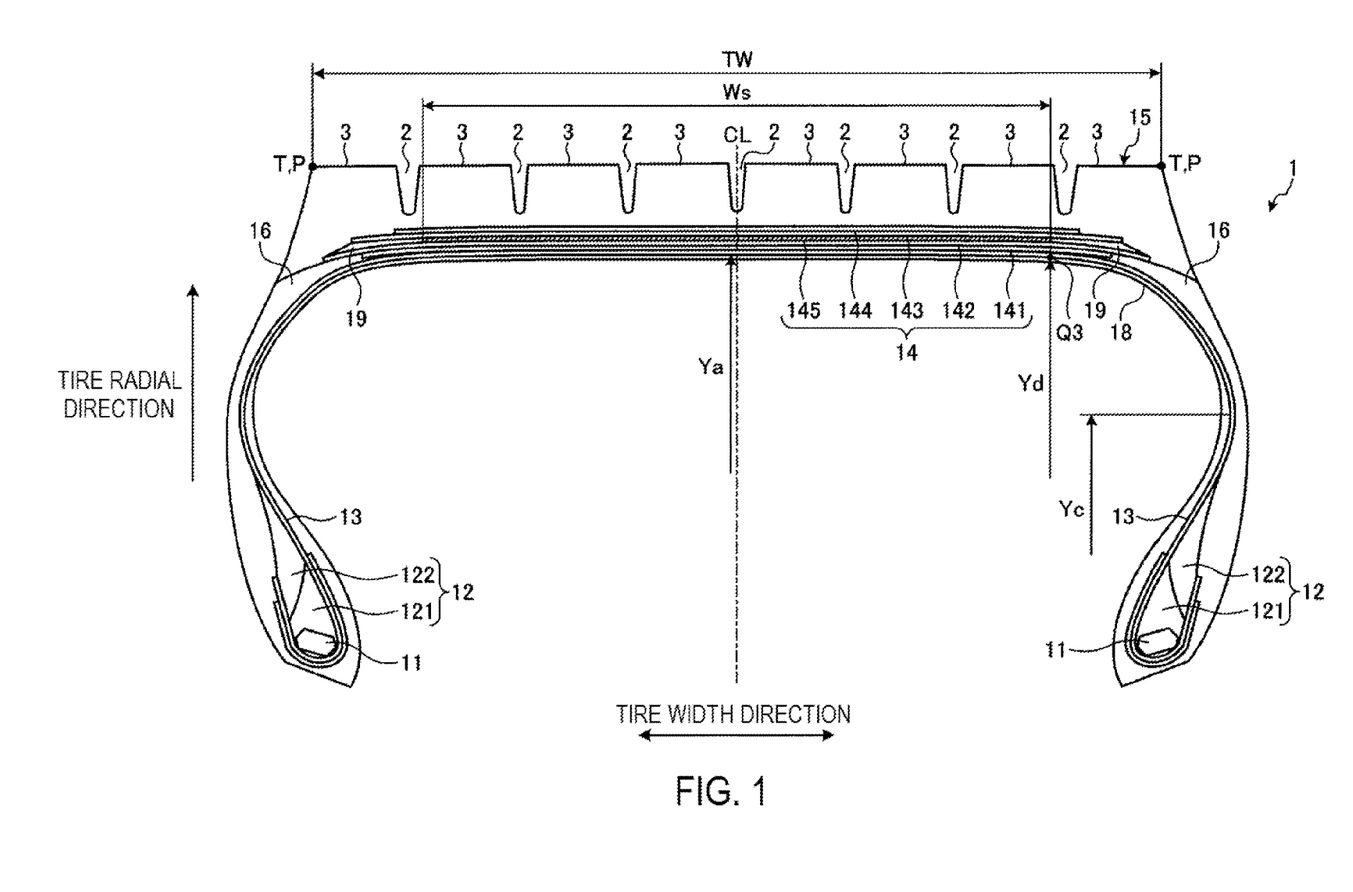
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In FIG. 1, a heavy-duty radial tire that is mounted on trucks, buses, and the like for long-distance transport is illustrated as an example of the pneumatic tire 1. Note that the symbol CL refers to a tire equatorial plane. Moreover, a tread end P and a tire ground contact end T are in accord with each other in FIG. 1. The circumferential reinforcing layer 145 in FIG. 1 is indicated by hatching.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1).

The pair of bead cores 11,11 have an annular structure and constitute cores of left and right bead portions. The pair of bead fillers 12,12 are each formed of a lower filler 121 and upper filler 122, and are disposed on the outer circumference of the pair of bead cores 11,11 in the tire radial direction so as to reinforce the bead portions.

The carcass layer 13 stretches between the left and right side bead cores 11, 11 in toroidal form, forming a framework for the tire. Additionally, both end portions of the carcass layer 13 are folded from the inner side in the tire width direction toward the outer side in the tire width direction and are fixed so as to wrap around the bead cores 11 and bead fillers 12. Also, the carcass layer 13 is constituted by a plurality of carcass cords formed of steel or organic fiber material (e.g. nylon, polyester, or rayon), covered by coating rubber and subjected to a rolling process, and has a carcass angle (inclination angle of the carcass cord in a fiber direction with respect to the tire circumferential direction), in absolute terms, of not less than 85° and not more than 95°.

The belt layer 14 is formed by laminating a plurality of belt plies 141 to 145, and is disposed extending over the outer circumference of the carcass layer 13. A detailed configuration of the belt layer 14 is described below.

The tread rubber 15 is disposed on the outer circumference of the carcass layer 13 and the belt layer 14 in the tire radial direction, and forms a tread portion of the tire. The pair of side wall rubbers 16, 16 are disposed on the outer sides of the carcass layer 13 in the tire width direction so as to form left and right sidewall portions of the tire.

In the configuration illustrated in FIG. 1, the pneumatic tire 1 includes seven circumferential main grooves 2 that extend in the tire circumferential direction, and eight land portions 3 defined and formed by the circumferential main grooves 2. Each of the land portions 3 is a segmented block formed by a rib or lug groove (not illustrated) continuously extending in the tire circumferential direction.

Here, "circumferential main grooves" refer to circumferential grooves having a groove width of 5.0 mm or greater. The groove widths of the circumferential main grooves are measured excluding notched portions and/or chamfered portions formed on the groove opening portion.

Additionally, in the pneumatic tire 1, the left and right outermost circumferential main grooves 2, 2 in the tire width direction are referred to as outermost circumferential main grooves. Moreover, the left and right land portions 3, 3 on the outer side in the tire width direction that are defined by the left and right outermost circumferential main grooves 2, 2 are referred to as shoulder land portions.

[Belt Layer]

Figure 2:
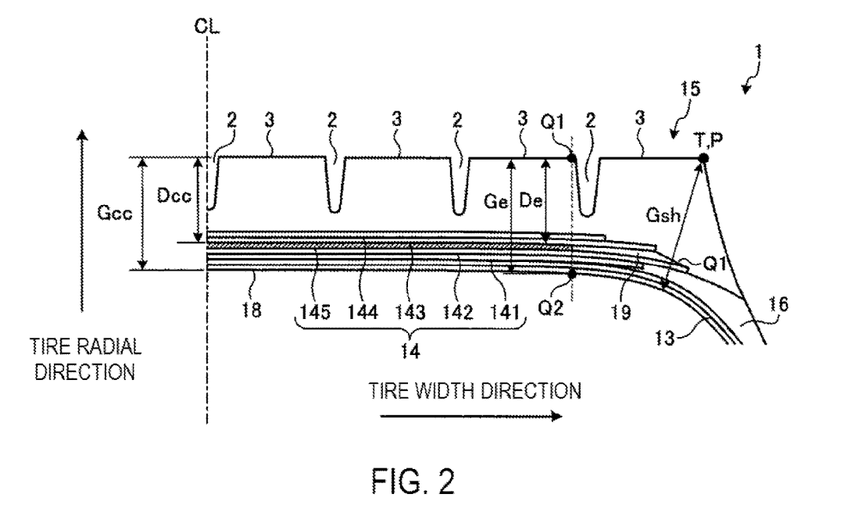
FIG. 2 is an explanatory view illustrating a belt layer of the pneumatic tire depicted in FIG. 1.
Figure 3:
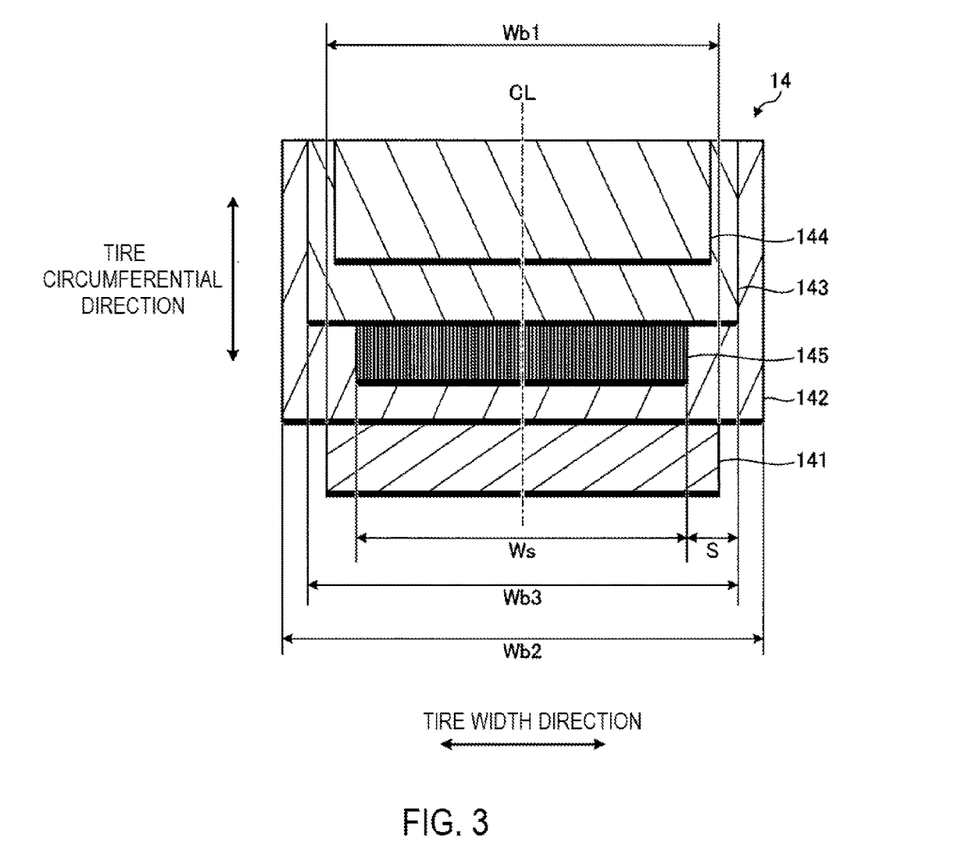
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates a region on one side of a tread portion demarcated by the tire equatorial plane CL, and FIG. 3 illustrates a laminated structure of the belt layer 14. Note that the thin lines in the belt plies 141 to 145 in FIG. 3 schematically represent the respective belt cords of the belt plies 141 to 145.

The belt layer 14 is formed by laminating a high angle belt 141, a pair of cross belts 142, 143, a belt cover 144, and a circumferential reinforcing layer 145, and is disposed extending over the outer circumference of the carcass layer 13 (see FIG. 2).

The high angle belt 141 is constituted by a plurality of belt cords formed of steel or organic fiber material, covered by coating rubber and subjected to a rolling process, and has a belt angle (inclination angle of the fiber direction of the belt cords with respect to the tire circumferential direction), in absolute terms, of not less than 45° and not more than 70°. Moreover, the high-angle belt 141 is laminated and disposed on the outer side of the carcass layer 13 in the tire radial direction.

The pair of cross belts 142, 143 are constituted by a plurality of belt cords formed of steel or organic fiber material, covered by coating rubber and subjected to a rolling process, and have a belt angle, in absolute terms, of not less than 10° and not more than 45°. Additionally, the pair of cross belts 142, 143 have belt angles that are of mutually opposite signs, and are laminated so that the fiber directions of the belt cords intersect each other (a crossply structure). In the following description, the cross belt 142 positioned on the inner side in the tire radial direction is referred to as an "inner-side cross belt", and the cross belt 143 positioned on the outer side in the tire radial direction is referred to as an "outer-side cross belt". Note that three or more cross belts may be laminated and disposed (not illustrated). Moreover, the pair of cross belts 142, 143 are laminated and disposed on the outer side of the high angle belt 141 in the tire radial direction in the present embodiment.

The belt cover 144 is constituted by a plurality of belt cords formed of steel or organic fiber material, covered by coating rubber and subjected to a rolling process, and has a belt angle, in absolute terms, of not less than 10° and not more than 45°. Moreover, the belt cover 144 is laminated and disposed on the outer side of the cross belts 142, 143 in the tire radial direction. Note that, in this embodiment, the belt cover 144 has the same belt angle as the outer-side cross belt 143, and is disposed on the outermost layer of the belt layer 14.

The circumferential reinforcing layer 145 is constituted by belt cords formed of steel and covered by coating rubber that are wound spirally with an inclination in a range of ±5° with respect to the tire circumferential direction. Additionally, the circumferential reinforcing layer 145 is disposed interposed between the pair of cross belts 142, 143 in the present embodiment. Additionally, the circumferential reinforcing layer 145 is disposed on the inner side, in the tire width direction, of the left and right edge portions of the pair of cross belts 142, 143. Specifically, the circumferential reinforcing layer 145 is formed of one or a plurality of wires being wound spirally on the outer circumference of the inner-side cross belt 142. The circumferential reinforcing layer 145 reinforces the rigidity in the tire circumferential direction. As a result, the tire durability is improved.

Note that, in the pneumatic tire 1, the belt layer 14 may have an edge cover (not illustrated). Generally, the edge cover is constituted by a plurality of belt cords formed of steel or organic fiber material, covered by coating rubber and subjected to a rolling process, and has a belt angle, in absolute terms, of not less than 0° and not more than 5°. Additionally, the edge covers are disposed on the outer side, in the tire radial direction, of the left and right edge portions of the outer-side cross belt 143 (or the inner-side cross belt 142). The difference in radial growth between the center region and the shoulder region of the tread portion is reduced and uneven wear resistance of the tire is improved due to a hoop effect demonstrated by the edge covers.

[Rupture Resistance of Belt Cord]

Recently, heavy duty tires mounted on trucks, buses and the like are able to retain the shape of the tread portion due to the tires having a low aspect ratio on the one hand and due to the disposition of a circumferential reinforcing layer in the belt layer on the other hand. Specifically, by disposing the circumferential reinforcing layer in the tread center region, and exploiting the hoop effect thereof, radial growth of the tread is suppressed and the tread shape is retained.

In such a configuration, repeating strain acts on the circumferential reinforcing layer due to contact and non-contact with the ground while the tire is rolling and thus there is a concern that the belt cords at the end portion of the circumferential reinforcing layer may rupture.

Accordingly, the pneumatic tire 1 employs the following configuration to improve the rupture resistance of belt cords (see FIGS. 1 to 3).

As illustrated in FIG. 2 in the pneumatic tire 1, a distance Gcc from the tread profile to the tire inner circumferential surface along the tire equatorial plane CL, and a distance Gsh from the tread end P to the tire inner circumferential surface preferably have a relationship satisfying 1.10≤Gsh/Gcc. In particular, the ratio Gsh/Gcc is preferably within a range satisfying 1.20≤Gsh/Gcc as demonstrated by the belowmentioned results of performance tests (see FIG. 8). As a result, belt-edge-separation resistance of the tire is effectively improved.

Conversely, while the upper limit of the ratio Gsh/Gcc is not limited in particular, the radius at the tread end P of the tread profile is preferably equal to or less than the radius at the tire equatorial plane CL when the tire is mounted on a specified rim and inflated to a specified inner pressure when no load is applied. That is, the tread profile is configured to have an arc shape or a linear shape having a center on the inner side in the tire radial direction and not to have an inverse-R shape (an arc shape having a center on the outer side in the tire radial direction). For example, the upper limit of the ratio Gsh/Gcc is about 1.4 to 1.5 in the configuration having a square-shaped shoulder portion as in FIG. 2. Conversely, the upper limit of the ratio Gsh/Gcc is about 1.3 to 1.4 in the configuration having a round-shaped shoulder portion as in FIG. 6.

The distance Gcc is measured as the distance from the intersection of the tire equatorial plane CL and the tread profile to the intersection of the tire equatorial plane CL and the tire inner circumferential surface when viewed as a cross-section in the tire meridian direction. Therefore, in a configuration having a circumferential main groove 2 at the tire equatorial plane CL such as the configuration illustrated in FIG. 1 and FIG. 2, the distance Gcc is measured excluding the circumferential main groove 2. The distance Gsh is measured as the length of a perpendicular line from the tread end P to the tire inner circumferential surface when viewed as a cross-section in the tire meridian direction.

Note that, in the configuration illustrated in FIG. 2, the pneumatic tire 1 includes an innerliner 18 on the inner circumferential surface of the carcass layer 13, and the innerliner 18 is disposed across the entire region of the tire inner circumferential surface. In such a configuration, the distance Gcc and the distance Gsh are measured from the outer surface of the innerliner 18 (tire inner circumferential surface).

In a configuration (1) having a square-shaped shoulder portion, the tread end P refers to a point of the edge portion thereof. For example, in the configuration illustrated in FIG. 2, the tread end P and a tire ground contact end T are in accord with each other due to the shoulder portion having a square shape. Conversely, in a configuration (2) having a round-shaped shoulder portion, as illustrated in the modified example of FIG. 6 described below, taking an intersection P' between the profile of the tread portion and the profile of the side wall portion when viewed as a cross-section in the tire meridian direction, the tread end P is taken as the bottom of a perpendicular line drawn from the intersection P' to the shoulder portion.

Additionally, the "tire ground contact end T" refers to the maximum width position, in a tire axial direction, of a contact surface between the tire and a flat plate in a configuration in which the tire is mounted on a specified rim, inflated to a specified inner pressure, placed perpendicularly to the flat plate in a static state, and loaded with a load corresponding to a specified load.

Herein, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified inner pressure" refers to "maximum air pressure" defined by JATMA, a maximum value in "TIRE ROAD LIMITS AT VARIOUS COLD INFLATION PRESSURES" defined by TRA, and "inflation pressures" defined by ETRTO. Note that "specified load" refers to "maximum load capacity" defined by JATMA, a maximum value in "TIRE ROAD LIMITS AT VARIOUS COLD INFLATION PRESSURES" defined by TRA, and "load capacity" defined by ETRTO. However, with JATMA, in the case of passenger car tires, the specified inner pressure is an air pressure of 180 kPa, and the specified load is 88% of the maximum load capacity.

Figure 4A:
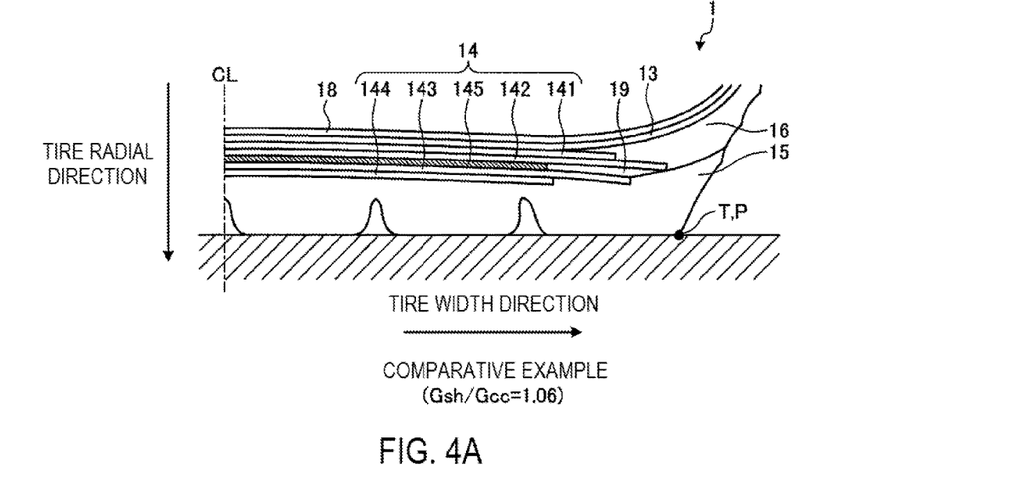
FIGS. 4A and 4B are explanatory views illustrating the effect of the pneumatic tire depicted in FIG. 1.
Figure 4B:
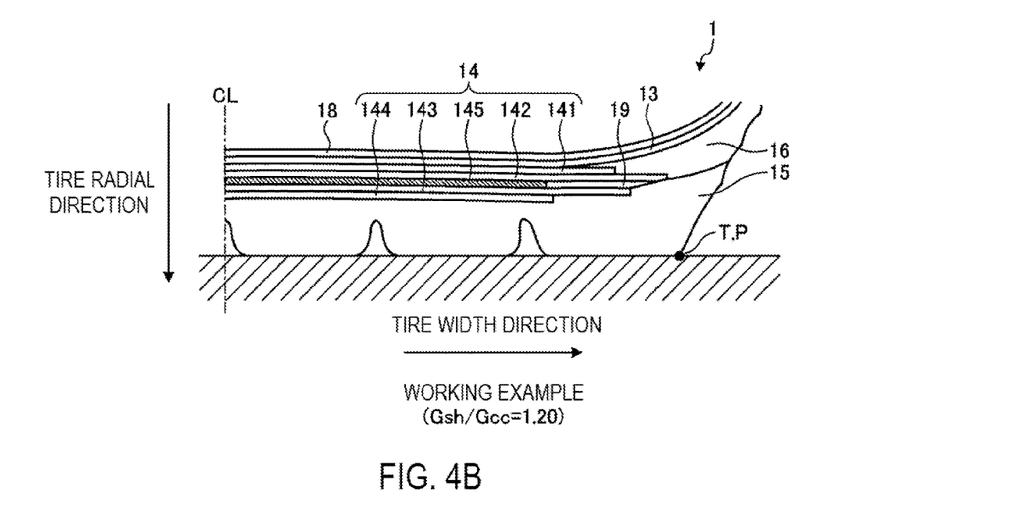
Figure 5:
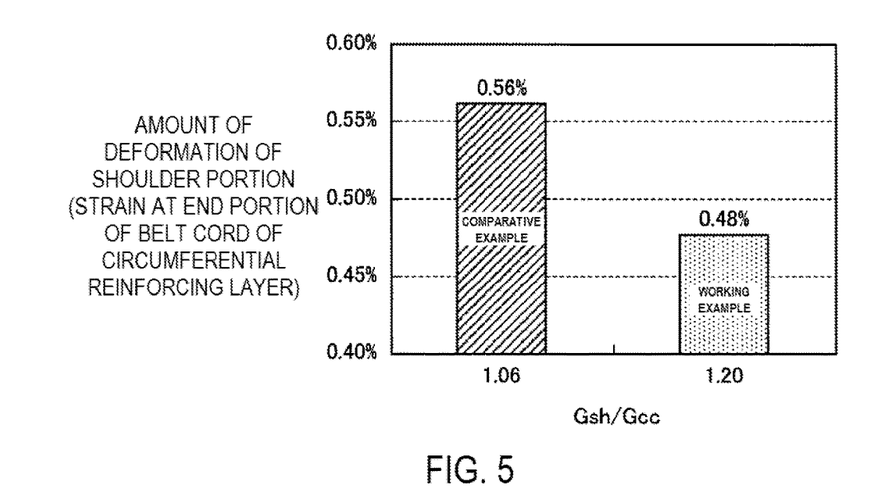
FIG. 5 is an explanatory view illustrating the effect of the pneumatic tire depicted in FIG. 1.

FIGS. 4A, 4B, and 5 are explanatory views illustrating effects of the pneumatic tire depicted in FIG. 1. Among these drawings, FIGS. 4A and 4B illustrate ground contact states of tires having mutually different ratios Gsh/Gcc, and FIG. 5 illustrates strain of the end portions of the belt cords of the circumferential reinforcing layer 145 for each of the tires illustrated in FIGS. 4A and 4B in contact with the ground.

The ratio Gsh/Gcc from the configurations illustrated in FIGS. 1 to 3 is decreased in the tire of the comparative example illustrated in FIG. 4A (Gsh/Gcc=1.06). As a result, the tread profile has a shoulder drop shape in which the outer diameter from the tire equatorial plane CL toward the tread end P is reduced when the tire is not in contact with the ground (not illustrated). Thus, when the tire comes into contact with the ground, as illustrated in FIG. 4A, the tread rubber 15 at the shoulder portion deforms greatly toward the road surface side (outer side in the tire radial direction), and each of the belt plies 141 to 145 of the belt layer 14 curves greatly toward the road surface side (outer side in the tire radial direction) as it goes toward the outer side in the tire width direction (see FIG. 4A). As a result, repeating strain of the end portions of the circumferential reinforcing layer while the tire is rolling is large and the belt cords of the circumferential reinforcing layer tend to rupture more easily.

The ratio Gsh/Gcc from the configurations illustrated in FIGS. 1 to 3 is increased in the tire of the working example illustrated in FIG. 4B (Gsh/Gcc=1.20). As a result, the difference in diameter of the outer diameter at the tread end P and the outer diameter along the tire equatorial plane CL in the tread profile is small and the tread surface has a flat shape (approximately parallel to the tire rotational axis) as a whole (see FIGS. 1 and 2). The volume (distance Gsh) of the tread rubber 15 at the shoulder portion is ensured and the rigidity of the shoulder land portion 3 is ensured. As a result, the amount of deformation of the shoulder portion while the tire is in contact with the ground is reduced (see FIG. 5), and the repeating strain of the end portions of the circumferential reinforcing layer 145 while the tire is rolling is decreased. As a result, rupture of the belt cords of the circumferential reinforcing layer is suppressed.

In the pneumatic tire 1, the distance Gcc from the tread profile to the tire inner circumferential surface along the tire equatorial plane CL, and a distance Ge from the tread profile to the tire inner circumferential surface at the end portion of the circumferential reinforcing layer 145 in the tire width direction have a relationship satisfying 1.00≤Ge/Gcc≤1.10 (see FIG. 2). Specifically, the distance from the tread profile to the tire inner circumferential surface in the region from the tire equatorial plane CL to the end portions of the circumferential reinforcing layer 145 is within a range of not less than 1.00 to not more than 1.10.

In such a configuration, the distance Ge and the distance Gcc are set to be approximately the same under the aforementioned condition of 1.10≤Gsh/Gcc. As a result, the circumferential reinforcing layer 145 has a flat shape when the tire is not in contact with the ground because the tire gauge and the tread gauge in the region from the tire equatorial plane CL to the end portion of the circumferential reinforcing layer 145 is made uniform (see FIGS. 1 and 2). Thus, the amount of deformation of the tread portion near the end portion of the circumferential reinforcing layer 145 while the tire is in contact with the ground is reduced (see FIG. 4B), and the repeating strain of the end portions of the circumferential reinforcing layer 145 while the tire is rolling is reduced. As a result, rupture of the belt cords of the circumferential reinforcing layer 145 is suppressed.

The distance Ge is measured, when viewed as a cross-section in the tire meridian direction, as the distance between intersections Q1, Q2 when a perpendicular straight line is drawn from the end portion of the circumferential reinforcing layer 145 to the tread profile to derive the intersection Q1 between the straight line and the tread profile and the intersection Q2 between the straight line and the tire inner circumferential surface.

A distance Dcc from the circumferential reinforcing layer 145 to the tread profile along the tire equatorial plane CL, and a distance De from the end portion of the circumferential reinforcing layer 145 to the tread profile have a relationship satisfying $0.95 \leq De/Dcc \leq 1.05$ in FIG. 2. As a result, the circumferential reinforcing layer 145 is disposed approximately parallel to the tire rotational axis.

The distance Dcc and the distance De are measured, when viewed as a cross-section in the tire meridian direction, as distances between the tread profile and an imaginary line along the outer side surface of the belt cord group in the tire radial direction at each of the positions on the circumferential reinforcing layer 145 when the tire is mounted on the specified rim, inflated to the specified inner pressure, and no load is applied.

A diameter Ya at the highest position of the carcass layer 13, a diameter Yc at the widest position of the carcass layer 13, and a diameter Yd of the carcass layer 13 at the position of the end portion of the circumferential reinforcing layer 145 have relationships satisfying $0.80 \leq Yc/Ya \leq 0.90$ and $0.95 \leq Yd/Ya \leq 1.00$ in FIG. 1. As a result, the shape of the carcass layer 13 is made appropriate.

The diameter Ya of the highest position of the carcass layer 13 is measured as a distance from the tire rotational axis to the intersection of the tire equatorial plane CL and the carcass layer 13 when the tire is mounted on the specified rim, inflated to the specified inner pressure, and no load is applied.

The diameter Yc of the widest position of the carcass layer 13 is measured as a distance from the tire rotational axis to the widest position of the carcass layer 13 when the tire is mounted on the specified rim, inflated to the specified inner pressure, and no load is applied.

The diameter Yd of the carcass layer 13 at the position of the end portion of the circumferential reinforcing layer 145 is measured as a distance from the tire rotational axis to a point Q3 when the tire is mounted on the specified rim, inflated to the specified inner pressure, and no load is applied, the point Q3 being the intersection of the carcass layer 13 and a straight line drawn from the end portion of the circumferential reinforcing layer 145 in the tire radial direction.

Additionally, a tread width TW and a width Ws of the circumferential reinforcing layer in the pneumatic tire 1 have a relationship satisfying $0.70 \leq Ws/TW \leq 0.90$ in FIG. 1.

The tread width TW is the distance between the left and right tread ends P, P in the tire rotation axis direction, which is measured when the tire is mounted on the specified rim, inflated to the specified inner pressure and no load is applied.

The width Ws of the circumferential reinforcing layer 145 is a distance in the tire rotation axis direction between the left and right end portions of the circumferential reinforcing layer 145 and is measured when the tire is mounted on the specified rim, inflated to the specified inner pressure, and no load is applied. When the circumferential reinforcing layer 145 has a structure divided in the tire width direction (not illustrated), the width Ws of the circumferential reinforcing layer 145 is a distance between the outermost end portions of the divided portions.

A pneumatic tire generally has a left-right symmetric structure centered on the tire equatorial plane CL as illustrated in FIG. 1. As a result, the distance from the tire equatorial plane CL to the tread end P is TW/2, and the distance from the tire equatorial plane CL to the circumferential reinforcing layer 145 is Ws/2.

In contrast, the range of the abovementioned ratio Ws/TW between the tread width TW and the width Ws of the circumferential reinforcing layer is defined by converting the widths to half widths from the tire equatorial plane CL in a pneumatic tire having a left-right asymmetric structure (not illustrated). Specifically, a distance TW' from the tire equatorial plane CL to the tread end P (not illustrated) and a distance Ws' from the tire equatorial plane CL to the end portion of the circumferential reinforcing layer 145 is set to have a relationship satisfying $0.70 \leq Ws'/TW' \leq 0.90$.

Additionally, a width Wb1 of the high angle belt 141 and a width Wb3 of the narrower cross belt 143 of the pair of cross belts 142, 143 preferably have a relationship satisfying $0.85 \leq Wb1/Wb3 \leq 1.05$ (see FIG. 3). As a result, the ratio Wb1/Wb3 is made appropriate.

The width Wb1 of the high angle belt 141 and the width Wb3 of the cross belt 143 are measured as distances in the tire width direction when the tire is mounted on the specified rim, inflated to the specified inner pressure, and no load is applied.

In the configuration in FIG. 1, the belt layer 14 has a left-right symmetric structure centered on the tire equatorial plane CL as illustrated in FIG. 3, and the width Wb1 of the high angle belt 141 and the width Wb3 of the narrower cross belt 143 have a relationship satisfying $Wb1 \leq Wb3$. As a result, an edge portion of the high angle belt 141 is disposed on an inner side of the edge portion of the narrower cross belt 143 in the tire width direction in a region on either side of the tire equatorial plane CL. However, the configuration is not limited thereto, and the width Wb1 of the high angle belt 141 and the width Wb3 of the narrower cross belt 143 may have a relationship satisfying $Wb1 \geq Wb3$ (not illustrated).

Moreover, belt cords of the high angle belt 141 are preferably steel wire, and the number of ends is preferably is not less than 15 cords/50 mm and not more than 25 cords/50 mm (see FIG. 4). The belt cords of the pair of cross belts 142, 143 are preferably steel wire, and the number of ends is preferably is not less than 18 ends/50 mm and not more than 28 ends/50 mm. The belt cords of the circumferential reinforcing layer 145 are steel wire, and the number of ends preferably is not less than 17 ends/50 mm and not more than 30 ends/50 mm. As a result, the strengths of the belt plies 141, 142, 143, 145 are properly ensured.

Moreover, a modulus E1 at 100% elongation of the coating rubber of the high angle belt 141 and a modulus Es at 100% elongation of the coating rubber of the circumferential reinforcing layer 145 preferably have a relationship satisfying $0.90 \leq Es/E1 \leq 1.10$ (see FIGS. 4A and 4B). Moreover, moduli E2, E3 at 100% elongation of the coating rubbers of the pair of cross belts 142, 143, and the modulus Es at 100% elongation of the coating rubber of the circumferential reinforcing layer 145 preferably have relationships satisfying $0.90 \leq Es/E2 \leq 1.10$ and $0.90 \leq Es/E3 \leq 1.10$. Moreover, the modulus Es at 100% elongation of the coating rubber of the circumferential reinforcing layer 145 preferably is in a range of $4.5\ MPa \leq Es \leq 7.5\ MPa$. As a result, the moduli of the belt plies 141, 142, 143, 145 are made appropriate.

The modulus at 100% elongation is measured in a tensile test at ambient temperature in conformance with JIS (Japanese Industrial Standard) K6251 (using dumbbell no. 3).

Moreover, a breaking elongation $\lambda 1$ of the coating rubber of the high-angle belt 141 is preferably equal to or greater than 200% (see FIGS. 4A and 4B). Moreover, breaking elongations $\lambda 2$, $\lambda 3$ of the coating rubbers of the pair of cross belts 142, 143 are both preferably equal to or greater than 200%. Furthermore, a breaking elongation $\lambda s$ of the coating rubber of the circumferential reinforcing layer 145 is preferably equal to or greater than 200%. As a result, the durability of the belt plies 141 142, 143, 145 is properly ensured.

Breaking elongation is measured by performing the tensile test on a test sample of 1B shape (dumb-bell shape with a thickness of 3 mm) defined by the JIS-K7162 using a tensile tester (INSTRON 5585H manufactured by Instron Corp.) conforming to JIS-K7161 at a pulling speed of 2 mm/min.

Elongation of the belts cords that constitute the circumferential reinforcing layer 145 when the belt cords are components is preferably not less than 1.0% and not more than 2.5% when the tension load is from 100 N to 300 N, and when the belt cords are of a tire (belt cords removed from a tire), is preferably not less than 0.5% and not more than 2.0% when the tension load is from 500 N to 1000 N. The belt cords (high elongation steel wire) have a better elongation ratio than that of a normal steel wire when a low load is applied; thus they can withstand loads that are applied to the circumferential reinforcing layer 145 during the time from manufacture until the tire is used, so it is preferable that damage to the circumferential reinforcing layer 145 can be suppressed.

The elongation of the belt cord is measured in accordance with JIS G3510.

Also, as illustrated in FIG. 3, the circumferential reinforcing layer 145 is preferably disposed on the inner side of the left and right edge portions of the narrower cross belt 143 of the pair of cross belts 142, 143 in the tire width direction. Additionally, the width Wb3 of the narrower cross belt 143 and the distance S from the edge portion of the circumferential direction reinforcing layer 145 to the edge portion of the narrower cross belt 143 is preferably in a range of $0.03 \leq S/Wb3 \leq 0.12$. As a result, the distance between the end portions of the width Wb3 of the cross belt 143 and the end portions of the circumferential reinforcing layer 145 is properly ensured. Note that this point is the same even if the circumferential reinforcing layer 145 has a divided structure (not illustrated).

The distance S of the circumferential reinforcing layer 145 is measured as a distance in the tire width direction when the tire is mounted on the specified rim, inflated to the specified inner pressure, and no load is applied.

Further, in the configuration in FIG. 1, the circumferential reinforcing layer 145 is constituted by a single steel wire wound spirally as illustrated in FIG. 3. However, the configuration is not limited as such, and the circumferential reinforcing layer 145 may also be constituted by a plurality of wires wound spirally with the wires arranged side-by-side to each other (multiple wound structure). In this case, the number of wires is preferably equal to or less than 5. Additionally, the winding width per unit when five wires are wound in a multiple wound manner is preferably not more than 12 mm. As a result, a plurality of wires (not less than two and not more than five wires) can be wound properly with an inclination in a range of $\pm 5°$ with respect to the tire circumferential direction.

Additionally, in the configuration in FIG. 2, the circumferential reinforcing layer 145 is disposed interposed between the pair of cross belts 142, 143 (see FIG. 2). However, the configuration is not limited thereto, and the circumferential reinforcing layer 145 may be disposed on the outer side of the pair of cross belts 142, 143 in the tire radial direction (not illustrated). Additionally, the circumferential reinforcing layer 145 may also be disposed on the inner side of the pair of cross belts 142, 143. For example, the circumferential reinforcing layer 145 may be (1) disposed between the high-angle belt 141 and the inner-side cross belt 142, or (2) disposed between the carcass layer 13 and the high angle belt 141 (not illustrated).

The breaking elongation of the tread rubber 15 in the pneumatic tire 1 is preferably equal to or greater than 350%. As a result, the strength of the tread rubber 15 is ensured and the occurrence of tearing in the outermost circumferential main groove 2 is suppressed. Further, the maximum breaking elongation of the tread rubber 15 is not specifically limited, but is constrained due to the type of rubber compound of the tread rubber 15.

The hardness of the tread rubber 15 in the pneumatic tire 1 is preferably in a range of 70 or less. As a result, the strength of the tread rubber 15 is ensured and the occurrence of tearing in the outermost circumferential main groove 2 is suppressed. While the upper limit of the hardness of the tread rubber 15 is not limited, the hardness is constrained due to the type of the rubber compound of the tread rubber 15.

Here, "rubber hardness" refers to JIS-A hardness in accordance with JIS-K6263.

[Round-shaped Shoulder Portion]

Figure 6:
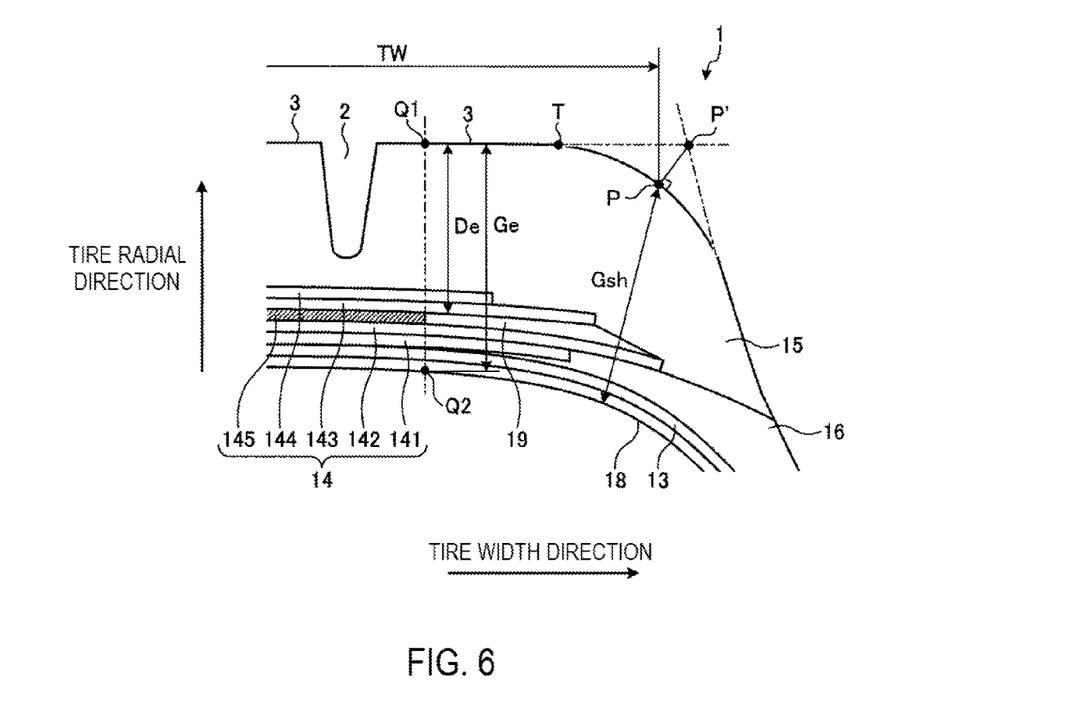
FIG. 6 is an enlarged view illustrating a main portion of the pneumatic tire depicted in FIG. 1.

FIG. 6 is an explanatory view of a modified example of the pneumatic tire depicted in FIG. 1. FIG. 6 illustrates a configuration having a shoulder portion with a round shape.

In the configuration in FIG. 1, the shoulder portion has a square shape in which the tire ground contact end T and tread end P are in accord, as illustrated in FIG. 2.

However, the shoulder portion is not limited as such and may also have a round shape, as illustrated in FIG. 6. In such a case, an intersection P' is taken between the profile of the tread portion and the profile of the side wall portion when viewed as a cross-section in the tire meridian direction, and the tread end P is taken as the bottom of a perpendicular line drawn from the intersection P' to the shoulder portion. Therefore, the tire ground contact end T and the tread end P normally are in mutually different locations.

[Belt Edge Cushion Two-color Structure]

Figure 7:
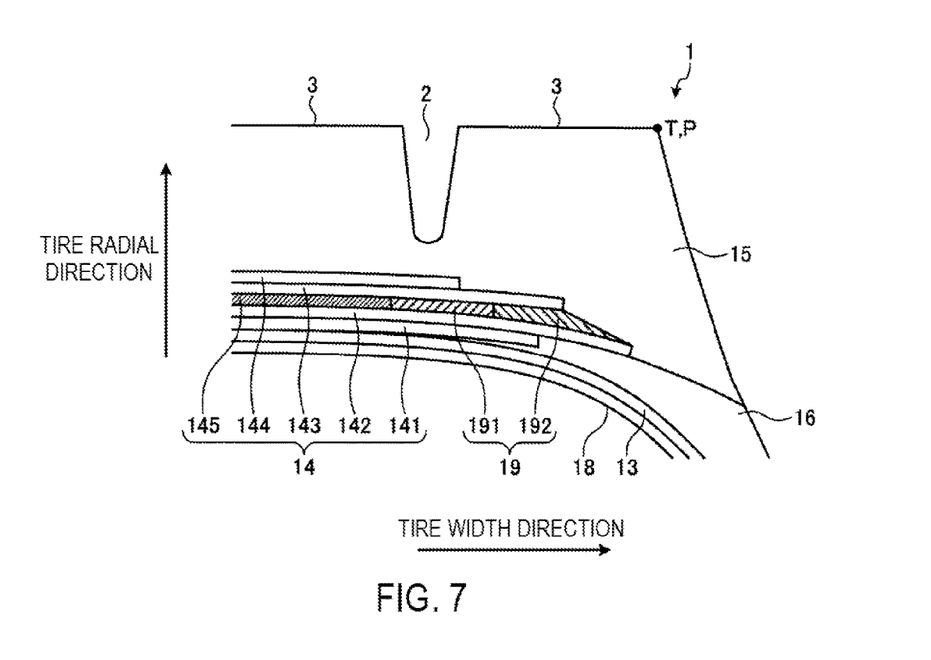
FIG. 7 is an enlarged view illustrating a main portion of the pneumatic tire depicted in FIG. 1.

FIG. 7 is an explanatory view of a modified example of the pneumatic tire depicted in FIG. 1. FIG. 7 is an enlarged view of an end portion of the belt layer 14 on the outer side in the tire width direction. The circumferential reinforcing layer 145 and the belt edge cushion 19 in FIG. 7 are indicated by hatching.

In the configuration illustrated in FIG. 1, the circumferential reinforcing layer 145 is disposed on the inner side of the left and right edge portions of the narrower cross belt 143 of the pair of cross belts 142, 143 in the tire width direction. The belt edge cushion 19 is disposed interposed between the pair of cross belts 142, 143 at a position corresponding to the edge portions of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than that of the coating rubber of the cross belts 142, 143. Specifically, the modulus E at 100% elongation of the belt edge cushion 19 and a modulus Eco of the coating rubber have a relationship satisfying $0.60 \leq E/Eco \leq 0.95$. As a result, there is an advantage that the occurrence of separation of rubber materials between the pair of cross belts 142, 143 and in a region on the outer side of the circumferential reinforcing layer 145 in the tire width direction is suppressed.

Conversely, according to the configuration illustrated in FIG. 7, the belt edge cushion 19 in the configuration illustrated in FIG. 1 has a two-color structure composed of a stress relief rubber 191 and an end portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The end portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, when viewed as a cross-section in the tire meridian direction, the belt edge cushion 19 has a structure composed of the stress relief rubber 191 and the end portion relief rubber 192 disposed side-by-side in the tire width direction to fill a region from the end portion of the circumferential reinforcing layer 145 on the outer side in the tire width direction to the edge portion of the pair of cross belts 142, 143.

Additionally, a modulus Ein at 100% elongation of the stress relief rubber 191 and the modulus Es at 100% elongation of the coating rubber of the circumferential reinforcing layer 145 have a relationship satisfying Ein<Es in the configuration in FIG. 7. Specifically, the modulus Ein of the stress relief rubber 191 and the modulus Es of the circumferential reinforcing layer 145 preferably have a relationship satisfying $0.6 \leq Ein/Es \leq 0.9$.

Moreover, in the configuration illustrated in FIG. 7, the modulus Ein at 100% elongation of the stress relief rubber 191 and a modulus Eco at 100% elongation of the coating rubber of the cross belts 142, 143 have a relationship satisfying Ein<Eco. Specifically, the modulus Ein of the stress relief rubber 191 and the modulus Eco of the coating rubber preferably have a relationship satisfying $0.6 \leq Ein/Eco \leq 0.9$.

Additionally a modulus Eout at 100% elongation of the end portion relief rubber 192 and the modulus Ein at 100% elongation of the stress relief rubber 191 preferably have a relationship satisfying Eout<Ein in the configuration in FIG. 7. Additionally, the modulus Ein at 100% elongation of the stress relief rubber 191 preferably is within a range of 4.0 MPa $\leq$ Ein $\leq$ 5.5 MPa.

Since the stress relief rubber 191 is disposed on the outer side of the circumferential reinforcing layer 145 in the tire width direction in the configuration illustrated in FIG. 7, shearing strain of the peripheral rubbers at the edge portions of the circumferential reinforcing layer 145 and between the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubbers of the circumferential reinforcing layer 145 is suppressed.

[Effect]

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). Moreover, the belt layer 14 is formed by laminating the pair of cross belts 142, 143 having a belt angle, in absolute terms, of not less than 10° and not more than 45° and of mutually opposite signs, and the circumferential reinforcing layer 145 having a belt angle within a range of ±5° with respect to the tire circumferential direction (see FIG. 3). Moreover, the distance Gcc from the tread profile to the tire inner circumferential surface along the tire equatorial plane CL and the distance Ge from the tread profile to the tire inner circumferential surface at the end portion on the outer side of the circumferential reinforcing layer 145 in the tire width direction have relationships satisfying $1.10 \leq Gsh/Gcc$ and $1.00 \leq Ge/Gcc \leq 1.10$ (see FIG. 2).

According to this configuration, (1) the ratio Gsh/Gcc is increased whereby the tread surface is given a flat shape (approximately parallel to the tire rotational axis) as a whole and the volume (distance Gsh) of the tread rubber 15 at the shoulder portion is ensured (see FIGS. 1 and 2). As a result, the amount of deformation of the shoulder portion while the tire is in contact with the ground is reduced. Moreover, (2) the distance Ge and the distance Gcc are set to be approximately the same under the aforementioned condition of $1.10 \leq Gsh/Gcc$ whereby the amount of deformation of the tread portion near the end portion of the circumferential reinforcing layer 145 while the tire is in contact with the ground is reduced. Consequently, there is an advantage that repeating strain at the end portion of the circumferential reinforcing layer 145 while the tire is rolling is reduced and rupturing of the belt cords of the circumferential reinforcing layer is suppressed. There is an advantage that the occurrence of separation of the peripheral rubbers at the end portions of the belt plies 141 to 145 and the occurrence of separation of the cord rubbers between adjacent belt plies 141 to 145 are suppressed. In particular, there is an advantage that the occurrence of separation at the end portions of the circumferential reinforcing layer 145 is suppressed.

The distance Dcc from the circumferential reinforcing layer 145 to the tread profile along the tire equatorial plane CL, and the distance De from the end portion of the circumferential reinforcing layer 145 to the tread profile have the relationship satisfying $0.95 \leq De/Dcc \leq 1.05$ (see FIG. 2). There is an advantage in such a configuration that strain at the end portions of the belt layer 14 while the tire is in contact with the ground is suppressed due to the circumferential reinforcing layer 145 being disposed approximately parallel to the tire rotational axis.

The diameter Ya at the highest position of the carcass layer 13, the diameter Yc at the widest position of the carcass layer 13, and the diameter Yd of the carcass layer 13 at the position of the end portion of the circumferential reinforcing layer 145 have relationships satisfying 0.80≤Yc/Ya≤0.90 and 0.95≤Yd/Ya≤1.00 in the pneumatic tire 1 (see FIG. 1). As a result, there is an advantage that the shape of the carcass layer 13 is made appropriate. That is, the amount of deformation of the carcass layer 13 in the disposition region of the circumferential reinforcing layer 145 is reduced while the tire is in contact with the ground due to the relationships 0.80≤Yc/Ya and 0.95≤Yd/Ya. As a result, the amount of deformation of the end portions of the circumferential reinforcing layer 145 is reduced and repeating strain of the belt cords is reduced. The tire shape is properly ensured due to the relationships Yc/Ya≤0.90 and Yd/Ya≤1.00.

The diameter Ya at the highest position of the carcass layer 13, the diameter Yc at the widest position of the carcass layer 13, and the diameter Yd of the carcass layer 13 at the position of the end portion of the circumferential reinforcing layer 145 have relationships satisfying 0.80≤Yc/Ya≤0.90 and 0.95≤Yd/Ya≤1.00 in the pneumatic tire 1 (see FIG. 1). As a result, there is an advantage that the shape of the carcass layer 13 is made appropriate. That is, the amount of deformation of the carcass layer 13 in the disposition region of the circumferential reinforcing layer 145 is reduced while the tire is in contact with the ground due to the relationships 0.80≤Yc/Ya and 0.95≤Yd/Ya. As a result, the amount of deformation of the end portions of the circumferential reinforcing layer 145 is reduced and repeating strain of the belt cords is reduced. The tire shape is properly ensured due to the relationships Yc/Ya≤0.90 and Yd/Ya≤1.00.

Additionally, the tread width TW and the width Ws of the circumferential reinforcing layer 145 in the pneumatic tire 1 have a relationship satisfying 0.70≤Ws/TW≤0.90 (see FIG. 1). According to this configuration, there is an advantage in that the amount of deformation of the shoulder land portion 3 when the tire is in contact with the ground is effectively reduced due to the ratio Ws/TW between the tread width TW and the width Ws of the circumferential reinforcing layer 145 being made appropriate (see FIGS. 4B and 5). That is, the width Ws of the circumferential reinforcing layer 145 is properly ensured and the amount of deformation of the shoulder land portion 3 when the tire is in contact with the ground is reduced due to the ratio Ws/TW being equal to or greater than 0.70. Meanwhile, when the ratio Ws/TW is equal to or less than 0.90, strain at the end portions of each of the belt plies is reduced due to deformation of the end portions of each of the belt plies being suppressed when the tire is in contact with the ground.

In the pneumatic tire 1, the circumferential reinforcing layer 145 is disposed on the inner side, in the tire width direction, of the left and right edge portions of the narrower cross belt 143 of the pair of cross belts 142, 143 (see FIG. 3). Additionally, the width Wb3 of the narrower cross belt 143 and the distance S from the edge portion of the circumferential reinforcing layer 145 to the edge portion of the narrower cross belt 143 is preferably in a range of 0.030≤S/Wb≤0.12. As a result, there is an advantage that a positional relationship S/Wb3 between the edge portions of the cross belts 142, 143 and the edge portions of the circumferential reinforcing layer 145 is made appropriate. That is, the distance between the end portion of the circumferential reinforcing layer 145 and the end portion of the cross belt 143 is properly ensured due to the relationship 0.03≤S/Wb3, and thus separation of the peripheral rubbers at the end portions of the belt plies 145, 143 is suppressed and strain of the belt cords at the end portions of the circumferential reinforcing layer 145 is reduced. Additionally, the relationship satisfying S/Wb3≤0.12 ensures the width Ws of the circumferential reinforcing layer 145 relative to the width Wb3 of the cross belt 143, thereby ensuring an appropriate hoop effect from the circumferential reinforcing layer 145.

Moreover, in the pneumatic tire 1, the belt cords of the circumferential reinforcing layer 145 are steel wire, and the number of ends of the circumferential reinforcing layer 145 is not less than 17 ends/50 mm and not more than 30 ends/50 mm. As a result, there is an advantage in that the number of ends of the belt cords of the circumferential reinforcing layer 145 is made appropriate. Specifically, the strength of the circumferential reinforcing layer 145 is properly ensured due to the circumferential reinforcing layer 145 having not less than 17 ends/50 mm. Moreover, the amount of rubber of the coating rubber of the circumferential reinforcing layer 145 is properly ensured and separation of the rubber materials between the adjacent belt plies (the pair of cross belts 142, 143 and the circumferential reinforcing layer 145 in FIG. 3) is suppressed due to the circumferential reinforcing layer 145 having not more than 30 ends/50 mm.

In the pneumatic tire 1, the elongation of the belt cords that constitute the circumferential reinforcing layer 145 when the belt cords are components is not less than 1.0% and not more than 2.5% when the tension load is from 100 N to 300 N. As a result, there is an advantage that the effect of suppressing radial growth in the center region is properly ensured due to the circumferential reinforcing layer 145.

In the pneumatic tire 1, the elongation of the belt cords that constitute the circumferential reinforcing layer 145 when the belt cords are of a tire is not less than 0.5% and not more than 2.0% when the tension load is from 500 N to 1000 N. As a result, there is an advantage that the effect of suppressing radial growth in the center region is properly ensured due to the circumferential reinforcing layer 145.

In the pneumatic tire 1, the circumferential reinforcing layer 145 is disposed on the inner side, in the tire width direction, of the left and right edge portions of the narrower cross belt 143 of the pair of cross belts 142, 143 (see FIG. 3). The pneumatic tire 1 includes the stress relief rubber 191 disposed between the pair of cross belts 142, 143 and on the outer side of the circumferential reinforcing layer 145 in the tire width direction so as to be adjacent to the circumferential reinforcing layer 145, and the end portion relief rubber 192 disposed between the pair of cross belts 142, 143, on the outer side of the stress relief rubber 191 in the tire width direction and at a position corresponding to the edge portions of the pair of cross belts 142, 143 so as to be adjacent to the stress relief rubber 191 (see FIG. 7).

In such a configuration, there is an advantage that fatigue rupture of the peripheral rubbers at the edge portions of the circumferential reinforcing layer 145 is suppressed due to the circumferential reinforcing layer 145 being disposed on the inner side, in the tire width direction, of the left and right edge portions of the narrower cross belt 143 of the pair of cross belts 142, 143. Since the stress relief rubber 191 is disposed on the outer side of the circumferential reinforcing layer 145 in the tire width direction, shearing strain of the peripheral rubbers at the edge portions of the circumferential reinforcing layer 145 and between the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, there is an advantage that separation of the peripheral rubbers of the circumferential reinforcing layer 145 is suppressed.

The modulus Ein at 100% elongation of the stress relief rubber 191 and the modulus Eco at 100% elongation of the coating rubber of the pair of cross belts 142, 143 have the relationship satisfying Ein<Eco in the pneumatic tire 1. As a result, there is an advantage that the modulus Ein of the stress relief rubber 191 is made appropriate and the shearing strain of the peripheral rubbers at the edge portions of the circumferential reinforcing layer 145 and between the cross belts 142, 143 is alleviated.

The modulus Ein at 100% elongation of the stress relief rubber 191 and the modulus Eco at 100% elongation of the coating rubber of the pair of cross belts 142, 143 have the relationship satisfying 0.6≤Ein/Eco≤0.9 in the pneumatic tire 1. As a result, there is an advantage that the ratio Ein/Eco is made appropriate and the shearing strain of the peripheral rubbers at the edge portions of the circumferential reinforcing layer 145 and between the cross belts 142, 143 is alleviated.

Figure 8:
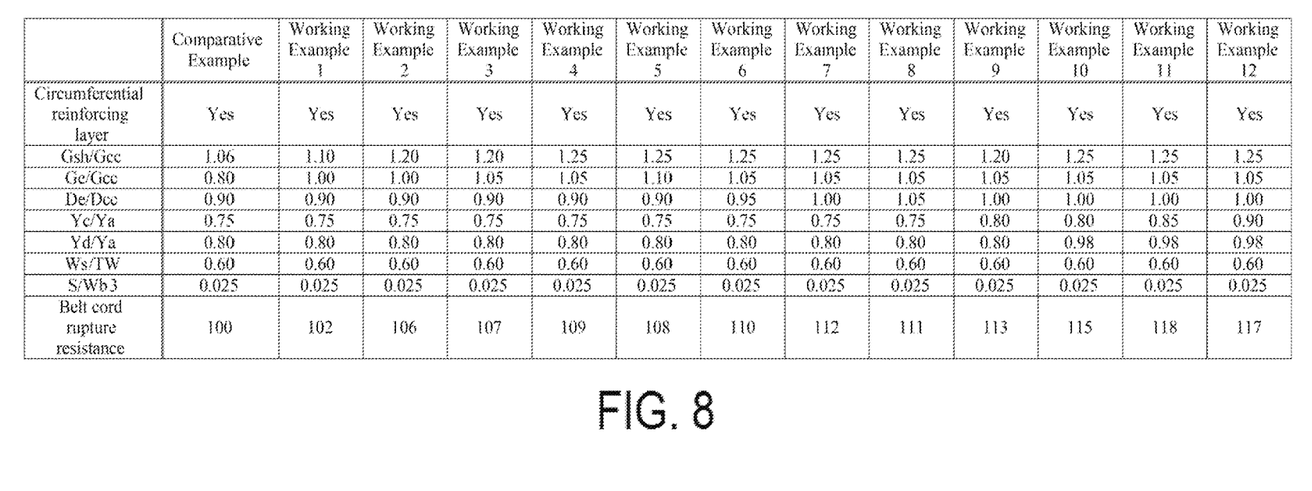
FIG. 8 is a table showing results of performance testing of the pneumatic tire according to the embodiment of the present technology.

Additionally, in the pneumatic tire 1, the modulus Ein at 100% elongation of the stress relief rubber 191 is in a range of 4.0 MPa≤Ein≤5.5 MPa (see FIG. 8). As a result, there is an advantage that the modulus Ein of the stress relief rubber 191 is made appropriate and the shearing strain of the peripheral rubbers at the edge portions of the circumferential reinforcing layer 145 and the cross belts 142, 143 is alleviated.

In the pneumatic tire 1, the belt layer 14 includes the high angle belt 141 having a belt angle of not less than 45° and not more than 70° in absolute terms (see FIGS. 1 and 3). As a result, there is an advantage in that the belt layer 14 is reinforced and strain of the end portions of the belt layer 14 when the tire is in contact with the ground is suppressed.

Additionally, the width Wb1 of the high-angle belt 141 and the width Wb3 of the narrower cross belt 143 of the pair of cross belts 142, 143 have a relationship satisfying 0.85≤Wb1/Wb3≤1.05 in the pneumatic tire 1 (see FIG. 3). In such a configuration, the ratio Wb1/Wb3 between the width Wb1 of the high angle belt 141 and the width Wb3 of the narrower cross belt 143 is made appropriate. As a result, there is an advantage in that strain of the end portions of the belt layer 14 when the tire is in contact with the ground is suppressed.

[Target of Application]

The pneumatic tire 1 is preferably applied to a heavy duty tire with an aspect ratio of not more than 70% when mounted on the regular rim, inflated to the regular inner pressure, and put under the regular load.

EXAMPLES

Figure 9:
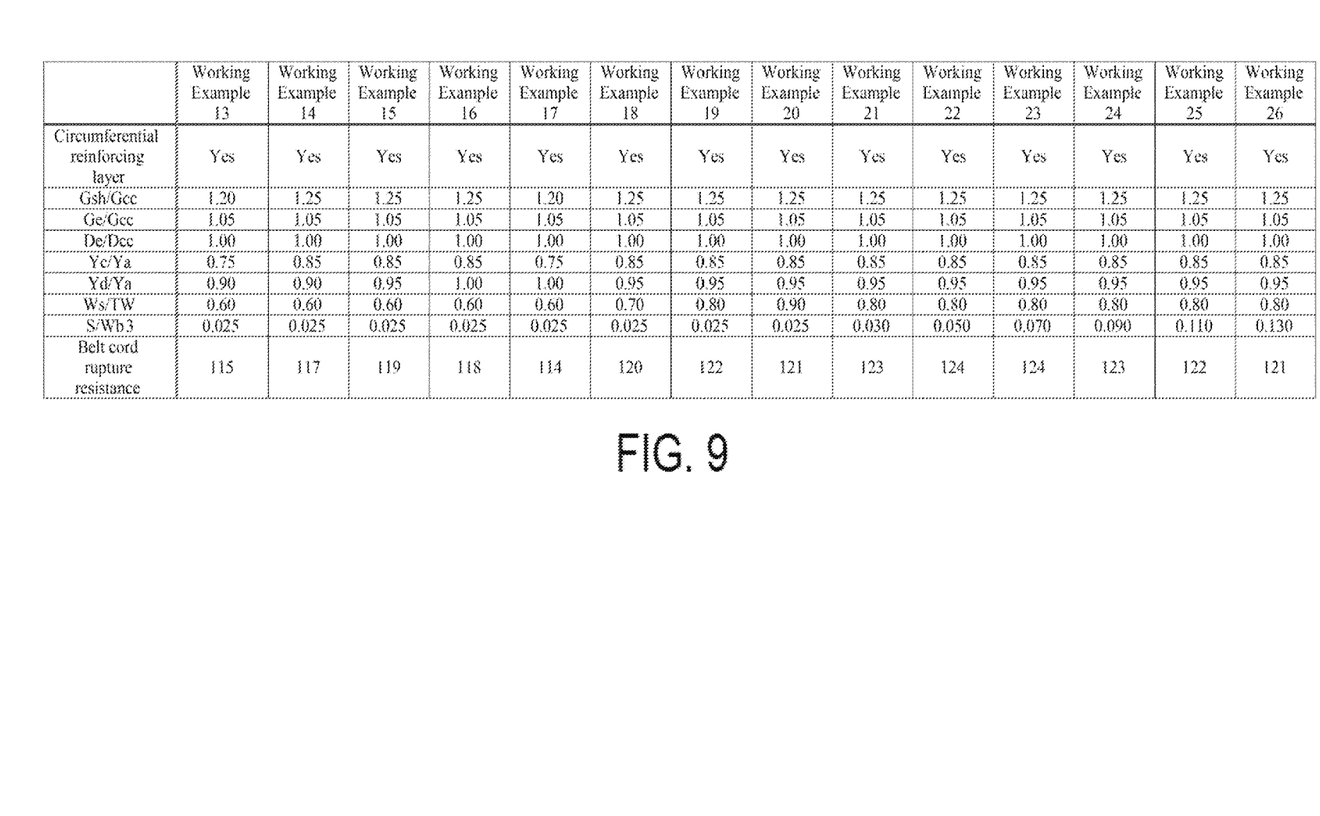
FIG. 9 is a table showing results of performance testing of the pneumatic tire according to the embodiment of the present technology.

FIGS. 8 and 9 are tables showing the results of performance testing of pneumatic tires according to the embodiment of the present technology.

Evaluations of belt cord rupture resistance of a plurality of mutually different pneumatic tires were conducted in this performance testing (see FIGS. 8 and 9). Pneumatic tires having a tire size of 315/60R22.5 were mounted on rims having a rim size of 22.5×9.00 and inflated to an air pressure of 720 kPa in the evaluations. Low pressure endurance testing was conducted using an indoor drum testing machine. The travel speed was set to 45 km/h and the load was gradually increased from 34.81 kN by 5% (1.74 kN) every 12 hours to obtain the rupture resistance of the belt cords. The rupture resistance of the belt cords was calculated as the strength retention of the belt cords, that is, as a ratio Fa/Fb between the strength of the belt cords after traveling Fa and the strength of the belt cords before traveling Fb. Based on the results, index evaluation was conducted using the conventional example as a reference (100). A larger numerical value is preferable in the evaluations. In particular, an evaluation of 115 or higher indicates an effect exceptionally superior to that of the conventional example.

The pneumatic tires 1 of the Working Examples 1 to 26 have the configuration illustrated in FIGS. 1 to 3. The main dimensions are set at TW=275 mm, Ya=446 mm, Gcc=32.8 mm, Dcc=22.3 mm, and Wb3=245 mm.

The pneumatic tire of the conventional example have numerical value ranges that differ from the pneumatic tire 1 of Working Example 1 in configuration illustrated in FIGS. 1 to 3.

As illustrated in the test results, the pneumatic tires 1 of Working Examples 1 to 26 demonstrate improved the rupture resistance of the belt cords of the tire. Moreover, when comparing Working Examples 1 to 16 in particular, it can be seen that an especially superior effect (evaluation of 115 or higher) of rupture resistance of belt cords is achieved due to the relationships 1.20≤Gsh/Gcc, 1.00≤Ge/Gcc≤1.10, and 0.80≤Yc/Ya≤0.90 or 0.95≤Yd/Ya≤1.00.

What is claimed is:

1. A pneumatic tire comprising:
a carcass layer;
a belt layer disposed on an outer side of the carcass layer in a tire radial direction;
a tread rubber disposed on an outer side of the belt layer in the tire radial direction;
at least three circumferential main grooves extending in a tire circumferential direction; and
a plurality of land portions defined by the circumferential main grooves;
the belt layer being formed by laminating a pair of cross belts having a belt angle of not less than 10° and not more than 45° in absolute terms and of mutually opposite signs, and a circumferential reinforcing layer having a belt angle within a range of ±5° with respect to a tire circumferential direction;
a distance Gcc from a tread profile to a tire inner circumferential surface along a tire equatorial plane, a distance Gsh from a tread end to the tire inner circumferential surface, and a distance Ge from the tread profile to the tire inner circumferential surface at an end portion on an outer side of the circumferential reinforcing layer in a tire width direction have relationships satisfying 1.20≤Gsh/Gcc≤1.50 and 1.00≤Ge/Gcc≤1.10;
a diameter Ya of a highest position of the carcass layer and a diameter Yd of the carcass layer at a position of the end portion of the circumferential reinforcing layer have a relationship satisfying 0.95≤Yd/Ya≤1.00; and
a tread width TW and a width Ws of the circumferential reinforcing layer have a relationship satisfying 0.70≤Ws/TW≤0.90.

2. The pneumatic tire according to claim 1, wherein a distance Dcc from the circumferential reinforcing layer to the tread profile along the tire equatorial plane and a distance De from an end portion of the circumferential reinforcing layer to the tread profile have a relationship satisfying 0.95≤De/Dcc≤1.05.

3. The pneumatic tire according to claim 1, wherein a diameter Ya of a highest position of the carcass layer and a diameter Yc of a widest position of the carcass layer have a relationship satisfying 0.80≤Yc/Ya≤0.90.

4. The pneumatic tire according to claim 1, wherein
the circumferential reinforcing layer is disposed on an inner side, in the tire width direction, of left and right edge portions of a narrower cross belt of the pair of cross belts; and wherein
a width Wb3 of the narrower cross belt and a distance S from an edge portion of the circumferential reinforcing layer to the edge portion of the narrower cross belt have a relationship satisfying $0.03 \leq S/Wb3$.

5. The pneumatic tire according to claim 1, wherein
belt cords of the circumferential reinforcing layer are steel wire and have a number of ends of not less than 17 ends/50 mm and not more than 30 ends/50 mm.

6. The pneumatic tire according to claim 1, wherein
elongation of belt cords constituting the circumferential reinforcing layer when the belt cords are components is not less than 1.0% and not more than 2.5% when a tension load is from 100 N to 300 N.

7. The pneumatic tire according to claim 1, wherein
elongation of belt cords constituting the circumferential reinforcing layer when the belt cords are of a tire is not less than 0.5% and not more than 2.0% when a tension load is from 500 N to 1000 N.

8. The pneumatic tire according to claim 1, wherein
the circumferential reinforcing layer is disposed on an inner side, in the tire width direction, of left and right edge portions of a narrower cross belt of the pair of cross belts; and wherein
a stress relief rubber is disposed between the pair of cross belts and on the outer side of the circumferential reinforcing layer in the tire width direction so as to be adjacent to the circumferential reinforcing layer, and
an end portion relief rubber is disposed between the pair of cross belts, on the outer side of the stress relief rubber in the tire width direction, and in a position corresponding to an edge portion of the pair of cross belts so as to be adjacent to the stress relief rubber.

9. The pneumatic tire according to claim 8, wherein
a modulus Ein at 100% elongation of the stress relief rubber and a modulus Eco at 100% elongation of coating rubber of the pair of cross belts have a relationship satisfying Ein<Eco.

10. The pneumatic tire according to claim 8, wherein
a modulus Ein at 100% elongation of the stress relief rubber and a modulus Eco at 100% elongation of coating rubber of the pair of cross belts have a relationship satisfying $0.6 \leq Ein/Eco \leq 0.9$.

11. The pneumatic tire according to claim 8, wherein
a modulus Ein at 100% elongation of the stress relief rubber is in a range of $4.0\ MPa \leq Ein \leq 5.5\ MPa$.

12. The pneumatic tire according to claim 1, wherein
the belt layer includes a high-angle belt having a belt angle of not less than 45° and not more than 70° in absolute terms.

13. The pneumatic tire according to claim 12, wherein
a width Wb1 of the high-angle belt and a width Wb3 of a narrower cross belt of the pair of cross belts have a relationship satisfying $0.85 \leq Wb1/Wb3 \leq 1.05$.

14. The pneumatic tire according to claim 1 applied to a heavy-duty tire with an aspect ratio of not more than 70%.

15. The pneumatic tire according to claim 1, wherein the diameter Ya of the highest position of the carcass layer and a diameter Yc of the widest position of the carcass layer have a relationship satisfying $0.84 \leq Yc/Ya \leq 0.90$.

16. The pneumatic tire according to claim 1, wherein a width Wb1 of the high-angle belt and the width Wb3 of the narrower cross belt of the pair of cross belts have a relationship satisfying $0.90 \leq Wb1/Wb3 \leq 1.05$.

17. The pneumatic tire according to claim 1, wherein the tread profile has a flat shape approximately parallel to the tire rotational axis.

\* \* \* \* \*